United States Patent [19]

Marie

[11] 4,235,517
[45] Nov. 25, 1980

[54] POWER LASER EMITTING PLASMA CONFINING WAVE BEAM

[76] Inventor: Georges R. P. Marie, 17, Avenue Raymond Croland, Fontenay-aux-Roses, France, 92260

[21] Appl. No.: 876,713

[22] Filed: Feb. 10, 1978

[30] Foreign Application Priority Data

Feb. 8, 1977 [FR] France ............................... 77 03419
Dec. 28, 1977 [FR] France ............................... 77 39449

[51] Int. Cl.² .............................................. H03F 7/00
[52] U.S. Cl. ...................................... 350/157; 330/43
[58] Field of Search ................. 350/147, 157; 330/4.3

[56] References Cited

U.S. PATENT DOCUMENTS

| 3,513,402 | 5/1970 | Marrison | 330/4.3 |
| 3,892,469 | 7/1975 | Lotspeich | 350/157 |
| 3,892,470 | 7/1975 | Lotspeich | 350/157 |

*Primary Examiner*—John K. Corbin
*Assistant Examiner*—R. A. Rosenberger
*Attorney, Agent, or Firm*—Abraham A. Saffitz

[57] ABSTRACT

Generator and power amplifier of plasma confining, electromagnetic, light or infrared wave beam. It comprises a generator of a rectilinear polarized wave beam and a solid state laser beam amplifier amplifying the rectilinear polarized wave beam after conversion of the same and having a doped active material in the shape of an annular sleeve member. This amplifier operates in the $TM_o$ annular mode. It is preceded and followed by mode converters. The first mode converter before the amplifier converts the rectilinear polarized wave beam to a $TM_o$ mode wave beam and the second mode converter after the amplifier converts the amplified $TM_o$ wave beam to a negatively azimuthally phase shifted, circular polarized wave beam.

10 Claims, 9 Drawing Figures

POWER LASER EMITTING PLASMA CONFINING WAVE BEAM

BACKGROUND OF THE INVENTION

1. Field of the Invention

The invention relates to generators of electromagnetic, light or infrared waves having plasma confining modes and, more particularly to generators of such waves embodying non confining to confining mode converters.

Confinement of plasmas is of prime importance in research on coherent X-ray emission or the approach of thermonuclear fusion by focusing high power laser beams on to a fusion material.

In official wave terminology, the wave mode is followed by two subscripts. The first denotes the number of spatial periods in the azimuthal direction and the second denotes the number of spatial periods in the radial direction. In the present specification, we shall never give the second subscript since, from this point of view, the mode will always be near the fundamental conditions, the proportion of harmonics being relatively low and varying with the distance from the axis when the intensity of the wave is varied.

2. Description of Prior Art

Confining mode waves are defined in U.S. Pat. application Ser. No. 863,235 filed Dec. 11, 1977 in the name of the present Applicant.

The term "plasma confining waves" or simply "confining waves" is used for electromagnetic waves having an electric field which is zero at at least one point along the propagation axis. Confining waves have the property of collecting electrons at confinement points where the electric field is zero. The confining force driving the electrons towards the points of confinement is proportional to the gradient of the square of the modulus of the electric field. This confining force contains an electric component and a magnetic component; the magnetic component can be neglected in certain cases.

$TE_0$, $TE_2$, $TM_2$ modes and, more generally, $TEM_q$ modes are confining modes, the electric field being zero at all the points on their axes of propagation. In the case of the $TE_0$, $TE_2$ and $TM_2$ modes, the confining potential near the axis is proportional to the square of the distance from the axis. In the case of $TEM_q$ modes with q greater than 2, the confining potential near the axis is proportional to the $2(q-1)^{th}$ power of the distance from the axis. As it will be explained later, the $TM_0$ wave is also a confining mode wave when it is stationary.

These confining propagation modes are used in combination with an axial magnetic field, which is designed for axially pinching the electrons converging towards the axis, as we have already shown in the aforementioned patent application and will show in a more general manner hereinafter.

Circular-polarized waves having a positive or negative azimuthal phase shift have the property of confining plasmas. If we limit ourselves to first-order azimuthal phase shifts, positively phase-shifted circular-polarized waves are mixtures of $TE_0$ and $TM_0$ modes in phase quadrature and negatively phase-shifted circular polarized waves are two $TE_2$ modes in phase quadrature and in space quadrature. In the case of $TE_0$ and $TE_2$ modes, the electrical field has no component outside the phase planes. The $TM_0$ mode has an axial component which is negligible when the beam used has a large diameter, of the order of $10^4$ times the wavelength.

The axial component of the electric field of the $TM_0$ mode becomes important when focusing occurs; it may reach the same order of magnitude as the radial field in the phase plane or may become even larger. Consequently, in the case of circular polarized waves having a first-order poritive azimuthal phase shift, the square of the electric field modulus is not zero along the propagation axis. If the square of the electric field modulus obtained on a circle of radius $\sigma$ has a given maximum value, the confining potential difference is much less for positively phase-shifted waves than for negatively phase-shifted waves.

As already said, the $TM_0$ wave is not confining except when steady, since in that case its axial electric field cancels out at each half wavelength. When the power of a laser is focused on to a solid material, producing a plasma, it is practivally impossible to obtain a steady wave since the absorbed energy progressively reduces the wave intensity and the energy is reflected in accordance with a diagram which is very different from that given by a plane mirror.

For these reasons, when attempting to obtain controlled thermonuclear fusion, it is preferable to use generators of laser beams having a circular-polarized confining mode which has a negative azimuthal phase shift and not a positive phase-shift.

The maximum power of neodymium lasers is proportional to the diameter on the doped glass cylindrical bars. In practice, the diameter does not exceed 10-12 cm since, at larger diameters, the light of the floodlamps energizing the laser is exclusively absorbed at the periphery and does not energize the interior of the laser bar. This disadvantage is obviated by using cylindrical sleeves of doped glass which present a larger area to the floodlamps for a given cross-section area available for laser beam propagation. The thickness of the sleeve thus corresponds to an optimum thickness for penetration of the pumping wave. The laser wave emitted by an aforementioned sleeve propagates in the $TM_0$ mode, which has a pattern of revolution adapted to the structure of the cylindrical sleeve.

It results from the foregoing that the $TM_0$ mode is a poor mode as regards to confinement and a convenient mode as regards to laser amplification.

Conventional laser beam generators produce rectilinear-polarized electromagnetic waves corresponding to the $TE_1$ propagation mode. The aforementioned patent application described means for converting rectilinear-polarized laser beam generators into confining mode laser beam generators. Two embodiments of mode converters were disclosed. The first kind of mode converters comprises sector-shaped half-wave plates disposed edge to edge on a transparent support so that their rapid (or slow) axes form broken hyperbolic or parabolic lines. The second kind of mode converters comprises transparent plates, one surface of which is helicoidal or forms a spiral staircase. In the abovementioned patent application, the mode converters convert rectilinear-polarized input wave beam into negatively azimuthally phase shifted circular polarized output wave beam. For doing this, the converters rotate the polarization vector of the input wave through an angle $-\phi$ around the beam axis at each point of azimuth $+\phi$.

SUMMARY OF THE INVENTION

Generally speaking, the invention concerns a laser beam generator and amplifier transmitting an output laser beam in a first order negatively aziputhally phase shifted, circular polarized mode in which the laser amplifier comprises a sleeve of solid active material operating in the TM$_0$ mode. The laser beam generator and amplifier comprises at least a first mode converter converting the TM$_0$ mode into the first order negatively azimuthally phase shofted, circular polarized mode ([TE$_{-2}$] mode). If the laser beam generator generates, as usual, a rectilinear-polarized laser wave beam, the laser beam generator and amplifier comprises a second mode converter converting the rectilinear-polarized mode into the TM$_0$ mode.

The principal objet of the invention is to provide generators and amplifiers of a laser beam having a circular-polarized propagation mode and a negative azimuthal phase shift comprising two mode converters for electromagnetic, light in infra-red waves, the second mode converter converting the incident beam into a TM$_0$ mode beam and the first converter converting the resulting beam into a circular-polarized beam having a negative azimuthal phase shift.

Another object of the invention is to provide devices for protecting the generators and amplifiers of "confining" electromagnetic waves against damage which they may suffer through reflected waves.

Another object of the invention is to provide mode converters adapted to convert a TM$_0$ mode to a first order negatively azimuthally phase shifted, circular polarized wave of the [TE$_{-2}$] mode.

REMINDER ABOUT THE PLASMA CONFINING PROPERTIES OF THE FIRST ORDER NEGATIVELY AZIMUTHALLY PHASE SHIFTED, CIRCULAR POLARIZED WAVES

In a phase plane referred to by the Ox, Oy axes and taken as the complex reference plane, the electric field of a circular-polarized plane wave of angular frequency $\omega$ can be represented by the complex number $$E_o \exp(j\omega t)$$

where $E_o$ is a reference amplitude of the electric field. The electric field of a circular polarized wave having a first-order negative azimuthal phase shift is represented, at a point near the propagation axis or Oz axis, by the complex number $$E_o \frac{r}{\sigma} \exp(j\omega t - \phi) \qquad (1)$$

where $r$ and $\phi$ respectively are the radius vector and the azimuth of the point in question and $\sigma$ is a reference length. As we shall see later, this is the first term of the series expansion of a function which, when r increases, passes through a maximum and subsequently falls to zero. The expression (1) can be broken up into the sum of two field vectors:

$$E \cos \omega t + Ej \sin \omega t$$

In the aforementioned patent application, formula (15) expresses the electric confining force which compresses the plasma along its axis and has the following value per electron:

$$S_o = \frac{e^2 E_0^2 r}{m\omega^2 \sigma^2} \qquad (2)$$

In the case of circular polarized waves having a first-order negative azimuthal phase shift, the magnetic confining force can be neglected, as stated in the aformentioned patent application.

In order to generalize the preceding formulae to the case where the radius vector r is not very small, we shall use a vectorial notation to calculate the confining force which appears in such case.

The most general electromagnetic vibration, of angular frequency $\omega$, can always be represented as the sum of two steady waves vibrating in quadrature, each represented by a field of vectors, and can be put into the following form:

$$\vec{E}(xyz) \cos \omega t + \vec{E}'(xyz) \sin \omega t$$

For example, in the case of a plane wave propagating in the Oz direction and circular-polarized in the xOy plane, the vectors $\vec{E}(xyz)$ and $\vec{E}'(xyz)$ have the following components:

$$\vec{E}(xyz) \begin{cases} E_x = E_o \cos(2\pi z/\lambda) \\ E_y = E_o \sin(2\pi z/\lambda) \\ E_x = 0 \end{cases} \quad \vec{E}'(xyz) \begin{cases} E_x' = -E_o \sin(2\pi z/\lambda) \\ E_y' = E_o \cos(2\pi z/\lambda) \\ E_z' = 0 \end{cases}$$

where $E_o$ is a reference field and $\lambda$ is the wavelength.

In the case of the fields $\vec{E}(xyz)$ and $\vec{E}'(xyz)$, the lines of force can be defined and the following notation can be used to show the properties of the fields, in association with their geometry: s and s'—curvilinear coordinates along the line of force;

$\vec{u}$ and $\vec{u}'$—unit vectors borne by the tangents to the lines of force;

$\vec{v}$ and $\vec{v}'$—unit vectors borne by the normals to the lines of force and towards the center of curvature; and R and R'—radii of curvature.

These geometrical data are related by the conventional formulae:

$$d\vec{u}/ds = \vec{v}/R \qquad d\vec{u}'/ds' = \vec{v}'/R'$$

Hereinafter, we shall write the formulae only for vector $\vec{E}$, since the formulae for the vector $\vec{E}'$ are identical but followed by an apostrophe.

Along a line of force, $\vec{E}(xyz)$ can be written $\vec{E}(s)\vec{u}$. By differentiating this expression of $\vec{E}(s)$ with respect to s, we obtain:

$$d\vec{E} = \left( \frac{dE}{ds} \vec{u} + E \frac{\vec{v}}{R} \right) ds \qquad (3)$$

When the motion of moving particles subjected to the electric field has a sufficiently large amplitude for the variation in E(s) to be perceptible between one end of its oscillation and the other, equation (3) has to be taken into account. A particle of charge e and mass m subjected to the field:

$$\left[\vec{E} + \frac{d\vec{E}}{ds} ds\right] \cos\omega t \tag{4}$$

has the following equation of oscillatory motion:

$$ds = -\frac{eE}{m\omega^2} \cos\omega t \tag{5}$$

The maximum force occurs at the ends of the oscillation. The field component $d\vec{E}/ds\, ds \cos \omega t$ does not change the oscillation amplitude but produces an additional field which can be called the differential field and is due to the motion. The corresponding additional force $\vec{S}$ is obtained by replacing $d\vec{E}$ and $ds$ by their expressions as given by relations (3) and (5) respectively, and then by replacing $\cos^2 \omega t$ by its expansion. We obtain:

$$\vec{S} = -\frac{e^2}{2m\omega^2}\left[E\frac{d\vec{E}}{ds} u + E^2 \frac{\vec{V}}{R}\right](1 + \cos 2\omega t) \tag{6}$$

In this equation, only the direct component is used in the following calculation.

We have already stated that expression (1) for circular-polarized waves having a first-order negative azimuthal phase-shift should be considered only as the first term of a series expansion. The lines of force are equilateral hyperbolas. If we move away from the central region, the lines of force cannot remain hyperbolical but must close. Allowing for symmetry, the excited mode will be the TEM$_2$ mode, i.e. formed by a sum of transverse electric waves TE$_2$ and transverse magnetic waves TM$_2$ (the subscript 2 indicates that the wave has two periods when the azimuth varies by $2\pi$). Since the TE$_2$ mode is dominant, we shall retain it only and assume that it is Gaussian.

If the angle of aperture of the focused beam is small, the components of vectors $\vec{E}$ and $\vec{E}'$ for this wave can be written as follows, with sufficient approximation:

$$\vec{E}(r,\phi,z)\begin{cases} E_r = E_o \frac{r}{\sigma} \exp\left[-\frac{r^2}{2\sigma^2}\right] \cos 2\phi \cos(2\pi z/\lambda) \\ E_\phi = E_o \frac{r}{\sigma}\left(1 - \frac{r^2}{\sigma^2}\right)\exp\left[-\frac{r^2}{2\sigma^2}\right](-\sin 2\phi)\cos(2\pi z/\lambda) \\ E_z = 0 \end{cases} \tag{7}$$

The cylindrical coordinates r, $\phi$, z are tangents, at the focal spot, to the hyperbolic coordinates of revolution which would have to be used for more exact calculation. The shape of the two components $E_r$ and $E_\phi$ of $\vec{E}(r, \phi, z)$ is traced in FIG. 1, in dependence on $r/\sigma$.

Vector $\vec{E}'$ is deduced from ventor $\vec{E}$ by derivation with respect to $(2\phi)$ and $(2\pi z/\lambda)$.

In this formulation, the axis $\phi = 0$ is an axis of symmetry for the field of vector $\vec{E}$ and an axis of antisymmetry for the field of vector $\vec{E}'$. However, with respect to a radius having a given azimuth $\phi$, the total field always appears as the sum of a symmetrical field and an antisymmetrical field. Consequently, the $\phi = 0$ axis is not privileged in any way and the value of the vector $\vec{S}_\rho$, which is the sum of the direct components of $\vec{S}$ and $\vec{S}'$, can be calculated on the points of the last-mentioned axis. In the case of the field $\vec{E}$, the line of force is the $\phi = 0$ axis, the radius of curvature of the line of force is infinite and the only component of $\vec{S}$ is that extending along $\vec{u}$, which is borne by the radius $\phi = 0$. In the case of the antisymmetric field $\vec{E}'$, the line of force perpendicularly intersects the radius vector $\phi = 0$ and the component along $\vec{u}'$ is zero, as a result of the antisymmetry. The normal $\vec{v}'$ is borne by the $\phi = 0$ axis; the center of curvature is on the side remote from the origin and the radius of curvature is given by $$R = r\left(1 - \frac{r^2}{\sigma^2}\right) \tag{8}$$

which is equivalent to r when r is small compared with $\tau$; when r becomes large, the lines of force close and surround four points at distance $\sigma$ from the optical axis.

Application of formula (6), allowing for the preceding remarks and for (8), shows that the sum $\vec{S}_o$ of the direct components of $\vec{S}$ and $\vec{S}'$ is a force having a modulus $S_o$ equal to:

$$S_o = \frac{e^2 E_o^2}{m\omega^2 \sigma}(r/\sigma)[1 - (r/\sigma)^2]\exp(-r^2/\sigma^2) \tag{9}$$

the direction of the force being along the radius vector and the force being oriented towards the optical axis is $r < \sigma$ or in the opposite direction is $r > \sigma$. Consequently $\vec{S}_o$ is a confining force inside the cylinder or radius $r = \sigma$, and a repelling force outside. At the limit where r is very small compared with $\sigma$, formula (9) gives formula (2). This force corresponds to a potential trough. If the edge of the trough is taken as the potential origin, we obtain $$U(r) = \int_{r=\sigma}^{x} \frac{1}{e} S_o\, dr = -U_o\left[1 - \frac{r^2}{\sigma^2}\exp[1 - (r/\sigma)^2]\right] \tag{10}$$

with $$U_o = \frac{e E_o^2}{2m\omega^2 \exp(1)} \tag{11}$$

with $\exp(1) = 2.71828$.

Figure 1:
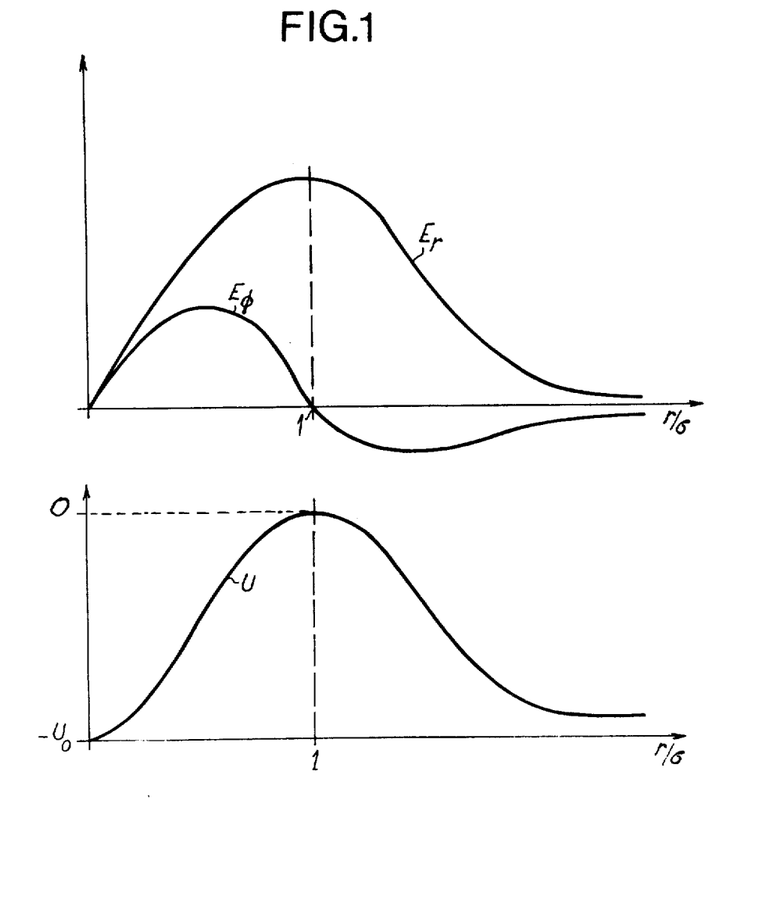
FIG. 1 has been used hereinbefore to illustrate some theoretical data in the preamble, ans shows the shape of the components $E_r$, $E_\phi$ of equation (7) and of the potential from equation (10), in dependence on $r/\sigma$.

The curve representing U(r) is drawn in FIG. 1.

$U_o$ is the potential difference between the bottom and the edge of the potential trough. It is interesting to relate its value to the power converging on the focal spot; i.e.:

$$W = \tfrac{1}{2}\epsilon_o c \int_0^\infty (E_r^2 + E_{100}^2) 2\pi r\, dr = 2\pi\sigma^2 \epsilon_o c E_o^2 \tag{12}$$

By eliminating $E_o$ between (11) and (12), allowing for the radius $\beta$ of an electron:

$$\beta = \frac{e^2}{4\pi\epsilon_o mc^2} = 2.815 \times 10^{-15} \text{ meters} \tag{13}$$

we obtain the relation:

$$U_o = \frac{\exp(-1)}{4\pi^2} \frac{\beta}{ec} \cdot \frac{\lambda^2}{\sigma^2} W \quad (14)$$

or the following in MKSA units:

$$U_{o\,volts} = 0.55 \times 10^{-6} \frac{\lambda^2}{\sigma^2} W_{watts} \quad (15)$$

The temperature of $10^8$ degrees Kelvin is a useful reference point for thermonuclear fusion. Since the Boltsman constant k is equal to $$k = 0.86 \times 10^{-4} \text{ eV per degree } K$$

the energy of particles at $10^8$ degrees is $3/2 \times 8.6$ keV.

They can therefore be contained by a potentiel barrier of 12.9 kV. As shown by equation (15) the power concentrated in the focal spot must be equal to:

$$W = 0.26 \times 10^{11} \frac{\sigma^2}{\lambda^2} \text{ watts} \quad (16)$$

Since the reference length $\sigma$ is of the same order as $\lambda$, we can say that, in order to confine a plasma by the method described in the present invention, about 26 Gigawatts are required per 100 million degrees. This power is easily obtainable in modern lasers.

The confining force $\vec{S}_o$ given by relation (9) is inversely proportional to the mass of the particles, i.e. it relates mainly to electrons, but these cannot concentrate along the axis without entraining the positive ions. The pressure exerted by the confining field on the electrons is in fact exerted on the entire plasma. Under this pressure, the plasma behaves like a degenerate gas subject to Fermi statistics. According to the Pauli principle, there cannot be more than two electrons of opposite spin in the phase extension cell defined by:

$$h^3 = \Delta x \, \Delta y \, \Delta z \, \Delta p_x \, \Delta p_y \, \Delta p_z \quad (17)$$

h being Planck's constant.

This is the limit to which the plasma can be compressed at the bottom of the potential trough, i.e. around the optical axis.

In classical mechanics, an electron leaving the potential trough must have an energy $eU_o$. The momentum of an electron retained in the trough is necessarily less than:

$$P_{max} = mc\sqrt{\frac{2eU_o}{mc^2}} \quad (18)$$

In the phase space, the point representing the momentum of an electron will be inside a sphere of radius $p_{max}$. Fermi statistics indicates that nearly all the cells defined by (17) will be full and there will be few electrons outside them.

Assuming that all the cells are full, $\frac{1}{8}\Delta x \, \Delta y \, \Delta z$ is the volume occupied by an electron in ordinary space. The density n of electrons per unit volume is the reciprocal of this volume; by (17) and (18) we obtain:

$$n = \frac{8\pi}{3}\left[\frac{p_{max}}{h}\right]^3 = \frac{\pi}{3}\left[\frac{2mc}{h}\right]^3 \left[\frac{2eU_o}{mc^2}\right]^{3/2} \quad (19)$$

with $(h/2mc = 1.22 \times 10^{-11}$ meters.

This electron density can be used to calculate the density of positive ions having a space charge which must compensate the space charge of the electrons. It can also be used to calculate the mean free path—i.e. either the average distance travelled by a positive ion between two impacts with electrons, ot the average distance travelled by a positive ion between two impacts with ions, with which it will unite. The second path is much longer because the relative speeds are much lower; it is of the order of a millimeter. However, it is not in a straight line but oscillates in the potential trough. In the plasma, the motion of particles is controlled by the action of the fields on the charges, so that impacts are relatively rare. The time taken to travel between two impacts between fusible ions, if their energy is sufficient, gives the life $\tau$ of the ions in the plasma in question. Allowing for the speed of the ions and the previously-given figures, the life can be estimated as of the order of $10^{-10}$ seconds. The fusion resulting from the impact of particles having an energy of the order of a keV gives rise to particles having an energy of the order of a MeV, which leave the trough without interfering with the motion of the ions.

The total number of ions in the trough can be evaluated and is substantially equal to the number of ions detached from the material by the laser beam inside the cylinder $r = \sigma$ during the life $\tau$ of the ions. Only the ions inside the cylinder $r = \sigma$ fall into the potential trough, since those outside the cylinder are repelled far from the optical axis.

The compression of ions around the optical axis must be accompanied by expulsion of ions from a region surrounding the compression region. The propagation modes of the laser beam used according to the invention produce a direct electric link between explosion and implosion.

The ratio between the energy flux of the laser wave in a circle of radius $\sigma$ and the total energy flux is obtained from equation (12), where the integration limits are between 0 and $\sigma$, and between 0 and $\infty$. The ratio is found to be 10%. Equation (14) relates the total energy flux W to the energy $eU_o$ of the particles which fall into the potential trough during the life $\tau$ of the ions. The number of ions can therefore be calculated:

$$\frac{W\tau}{eU_o} = \frac{4\pi^2}{\exp(-1)} \frac{\sigma^2}{\lambda^2} \frac{c\tau}{\beta} = 8.7 \frac{\sigma^2}{\lambda^2} \frac{c\tau}{\beta} \quad (20)$$

Since equation (19) gives the number of electrons per unit volume, if we know their total number we can determine the volume which they occupy. We find that only the bottom of the trough is occupied, i.e. the density of electrons around the bottom is low enough for the corresponding cut-off frequency to be much lower than the laser wave frequency. This justified the calculation of the confining forces given previously.

Hitherto, we have spoken only of the radial constriction of the plasma. In the aforementioned patent application, we have shown how an axial magnetic field in the focal spot can be used to obtain axial compression associated with magnetic "pinching".

Inside, the circle $r \leq \sigma$, the circular-polarized waves having a first-order negative azimuthal phase shift have electric lines of force which as a first apprximation can be identified with hyperbolas as shown in FIG. 2 of the aforementioned patent application, and this mode is comparable to the TE$_2$ mode in circular guide theory. Using the approximation $r \leq \sigma$, the confinement potential trough given by equation (10), is simplified to:

$$U(r) \approx -U_o + \frac{eE_o^2}{2m\omega^2} \frac{r^2}{\sigma^2} \cdot \qquad (21)$$

In a potential trough of this kind, the electron oscillates under the effect of a force proportional to its distance from the origin, its angular oscillation frequency $\Omega_o$ being given by:

$$\Omega_o = \frac{eE_o}{m\omega\sigma} \qquad (22)$$

In the presence of a direct axial magnetic field, the electrons falling into the potential trough defined by (21) begin to rotate. If we consider electrons which are initially on a single circle centered on the axis and are converging, the contracting circle must contain a flux which remains constant. As a result, the electrons rotate in a direction such that the magnetic field along the axis is considerably increased thereby. In addition, all the rotating circles of electrons are attracted, like the turns of a solenoid through which a dc current flows, and this results in axial pinching, which prevents the electrons concentrated near the center of the potential trough from escaping along the axis as a result of mutual electrostatic repulsion.

We shall give an approximate calculation of the value of the axial magnetic field necessary for such pinching.

The angular frequency at which an electron rotates in a circle when ejected into a space where there is only an induction field B, is the Larmor frequency $\omega_L = eB/m$. If the reference trihedron is a trihedron Ox,y,z rotating around an axis Oz parallel to B at the angular Larmor frequency $\omega_L$, exact compensation if obtained between the complementary acceleration and the effect of the magnetic induction field on the velocity of the electron. In a trihedron of this kind, the only observable forces are radial, i.e. the return force proportional to the distance from the axis $m\Omega_o^2 r$ where $\Omega_o$ is given by equation (22) and the centrifugal force $m\omega_L^2 r$. These two forces can be written $m\Omega^2 r$ with:

$$\Omega^2 = \Omega_o^2 - \omega_L^2 \qquad (23)$$

In this rotating trihedron, the electron describes an ellipse whose trajectory in the complex plane can be represented by the sum of two rotating vectors of constant amplitude:

$$\frac{\sigma}{2}\left[ (1 + \frac{\omega_L}{\Omega}) \exp j\Omega t + (1 - \frac{\omega_L}{\Omega}) \exp(-j\Omega t) \right] \qquad (24)$$

and in the fixed trihedron, the trajectory can be represented by:

$$\frac{\sigma}{2\Omega}[(\Omega + \omega_L)\exp[j(\Omega - \omega_L)t] + (\Omega - \omega_L)\exp[-j(\Omega + \omega_L)t]] \qquad (25)$$

This trajectory is a hypocycloid, the arc between two successive points of retrogression being equal to $(1 - \omega_L/\Omega)\pi$ and the time taken by the electron for travelling from one point to the other being $\pi/\Omega$. From the axis the electron rotates at an average angular velocity of $(\Omega - \omega_L)$ and therefore produces a magnetic field $e/2\pi (\Omega - \omega_L)$ ampereturns. Since the cylinder of radius $\sigma$ contains $\pi\sigma^2 n$ electrons per unit length, where n is the number of electrons per unit volume, the magnetic induction field along the axis is equal to $\frac{1}{2}\mu_o ne\sigma^2(\Omega - \omega_L)$. Since the lines of magnetic force are closed, the field at the outlet of the torus in which the electrons rotate is in a radial direction, and the action of the radial component of the magnetic field on the electrons axially compresses the torus. The axial magnetic compression must balance or be greater than the radial electric compression due to the confining field. At a distance r from the axis, the confining force derived from the potential (21) is equal to $m\Omega_o^2 r$ and the mean orthoradial speed of the electron is $(\Omega - \omega_L)r$. The value of the radial component of the magnetic induction field at the torus outlet is very near the value of the axial component at the center of the torus. To obtain magnetic pinching, the following condition:

$$\tfrac{1}{2}\mu_o n e^2 \sigma^2(\Omega - \omega_L)^2 r \leq m\Omega_o^2 r \qquad (26)$$

must be fulfilled. If we neglect $\omega_L$ compared with $\Omega$ and introduce in the calculation the plasma cut-off wavelength $\lambda_c$, which is equal to $\sqrt{\pi/\beta n}$, where $\beta$ is the radius of an electron as given by equation (13), the preceding equation can be written as follows:

$$\sqrt{2\pi} \; \sigma \geq \lambda_o \qquad (27)$$

This condition is always given in practice, since the wavelength used in very close to but less than $\lambda_c$; $\sigma$ is of the same order as $\lambda$ and the factor $\sqrt{2\pi}$ makes the inequality plausible. It must be stressed that condition (27) is an initial condition and is automatically amplified after the phenomenon has started; n tending towards infinity. The d.c. magnetic field occurs only during the starting-up of the phenomenon. Its state must not be drowned in the thermal agitation, i.e. at the beginning of the phenomenon, the velocity of $\omega_L \sigma$ must be at least of the same order as the velocity of thermal agitation.

The oscillation of the electrons in the potential trough is damped down since the electrons slightly attract the nuclei by electrostatic attraction when they converge towards the bottom of the trough. The increase in the density of positive charges at the bottom of the trough prevents the electrons from completely recovering their initial kinetic energy, and they are also trapped by magnetic pinching in a ring of current having a very small radius.

Furthermore, the main cause of loss when a plasma is heated is the Bremsstrahlung of the electrons. A is known, this effect can be reversed and the electrons can increase their energy at the expense of their photons. It is easy to show that, in the case of plasmas contracting in the previously-described manner, the losses are much lower than for expanding plasmas, since is two similar ions, assuming a single resonance frequency f, approach and if one emits a photon at the same frequency f, the other, as a result of the Doppler effect, will receive a photon at a frequency f'>f. It may absorb it and eject a photon at a frequency f'—f. However, if the ions are moving away, the photons received from one another will have frequencies $f'' < f$ and cannot be absorbed and will therefore be lost. If now we consider groups of ions and electrons just sufficiently large for a temperature to be definable and if all possibilities of radiation are represented, if the groups approach each experience the others as hotter than they really are, owing to the Doppler effect, and easily absorbs their radiation since heat spontaneously passes from a hot to a cold body. If, on the contrary, the groups are moving away from one another, each group experiences the others as colder than itself and cannot absorb their radiation.

In short, electromagnetic energy concentrates in a contracting plasma whereas there is an increase in radiation losses in an expanding plasma. For this reason, plasmas formed by a laser having a field mode which spontaneously causes confinement, have much lower Bremsstrahlung losses than plasmas produced by direct focusing of laser radiation having a $TE_1$ focal spot which, in accordance with the preceding formulae, produces an initially expanding plasma which, by reaction, produces a convergent electrostatic wave.

In addition, the plasma produced according to the invention is thermally insulated since the edges of the potential trough prevent electrons from crossing them.

BRIEF DESCRIPTION OF THE DRAWINGS

The invention will be more clearly understood from the following description and the corresponding accompanying drawings, in which.

DESCRIPTION OF THE PREFERRED EMBODIMENTS

Figure 2:
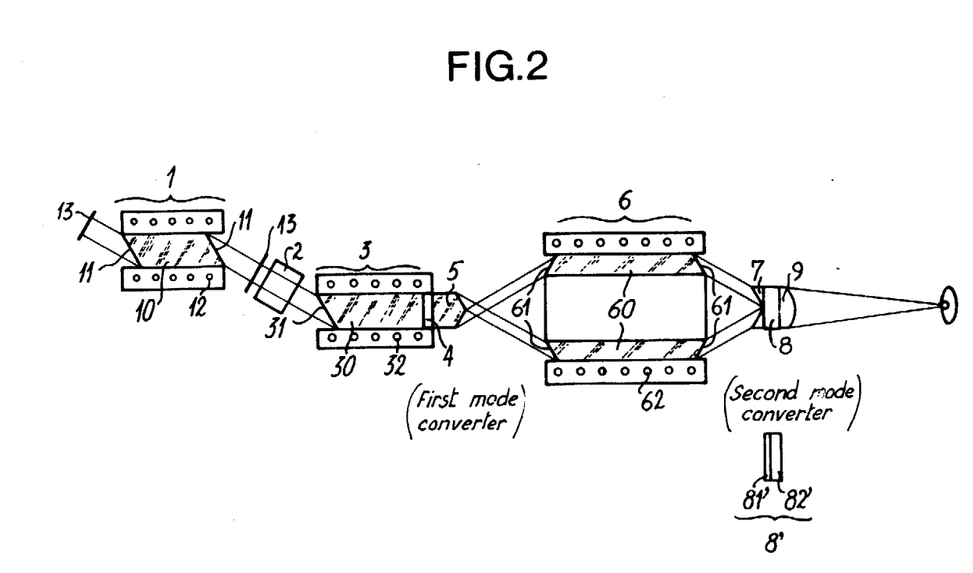
FIG. 2 is a general wiew of a laser and the accompanying mode converter.

FIG. 2 is a general view of a laser oscillator 1. It comprises a doped glass cylinder 10 having ends 11 which are inclined so that the beam comes out at the Brewster angle. Mirrors 13 form a resonant cavity and a helical luminescent tube 12 constitutes the excitation system. These components are conventional and nearly all of them are included in the amplifying lasers 3 and 6. A well-known pulse modulator device 2 is disposed between the oscillating laser and the amplification circuit.

The first amplifying stage is laser 3. Elements 30, 31, 32 serve the same purpose as elements 10, 11, 12 in laser 1.

According to the invention, the doped glass cylinder 30 comprises a mode converter 4 at its output end, this mode converter being of the kind shown in FIG. 9 in the aforementioned patent application and also comprises a conical lens 5. Mode converter 4 is made up of a set of quartz half-wave plates having rapid axes forming broken lines which approximate a set of homofocal parabolas, the focus being at the center of the converter. Such a mode converter converts a wave having rectilinear polarization in a direction parallel to the common axis of the parabolas into a $TM_0$ type wave, a wave whose magnetic lines of force are concentric circles centered on the focus of the parabolas. The quartz plates forming the mode converter 4 are secured by molecular adhesion to the flat surface of the conical lens 5. Lens 5 is made conical so that the $TM_0$ wave strikes it at the Brewster angle. The wave thus gives rise to a conical divergent beam radiated towards amplifier 6.

Since the doped glass of cylinder 30 is based on molten silica, the mode converter 4 is quartz and lens 5 is of molten silica, the assembly does not have any appreciable discontinuity in index. Advantageously, the assembly 4, 5 is separated from assembly 3, so that breakage or wear of one assembly does not make the other inoperative. To this end, without unnecessarily breaking the continuity of optical index, cedar oil or any other liquid used in immersion objectives in microscopes is inserted, since such liquids have optical indices fairly close to that of glass.

The amplifying laser bearing the general reference 6 comprises a cylindrical sleeve of doped glass 60. In high-power amplifiers, where the bar cross-section must be very large, the center of the bar may be insufficiently energized by the luminescent pumping tube surrounding the bar. Since the $TM_0$ mode pattern is a pattern of revolution, it allows to use a cylindrical sleeve instead of a cylindrical bar of active material. For a given radial thickness of the active material, i.e. for a given penetration depth of the pumping wave emitted by the helical tube 62, the transverse crosssection available to the laser wave if larger for a sleeve than for a bar. Thus the surface for admitting the pumping wave and the surface for admitting the laser wave to be amplified are increased without increasing the depth to which the pumping wave must penetrate.

The conical input and output faces 61 for the laser wave are at the Brexster angle to the wave.

The laser wave from amplifier 6 converges on an optical system comprising a conical lens 7, a second mode converter 8 and a concentrating lens 9 which focuses the beam on to the material to be plasmatized. This material is inserted in a magnetic circuit as described in the aforementioned patent application. Lens 9 preferably bears an anti-reflecting layer of optical thickness adapted to the wavelength used.

The second mode converter 8 must convert the $TM_0$ mode wave, which has been made plane by the conical lens 7, into a system of two orthogonal $TE_2$ waves in phase quadrature, which constitute a circular-polarized wave having a negative azimuthal phase shift.

In a first variant, the mode converter 8 comprises a helical phase-shifter similar to those shown in FIGS. 4 and 5 of the aforementioned patent application, FIG. 4 representing a continuous helicoid and FIG. 5 showing a spiral staircase approximation. In the aforementioned application, the azimuthal phase-shifters were used for the conversion from a circular-polarized wave to a circular-polarized wave having a negative azimuthal phase-shift. In the present case, the required conversion is from a TM$_0$ mode wave, i.e. from one component of a circular-polarized wave having a positive azimuthal phase shift, to a circular-polarized wave having a negative azimuthal phase shift.

Consequently, whereas in the aforementioned patent application the pitch p of the helix in FIG. 4 and the height $\Delta z$ of the steps in FIG. 5 are the following respectively:

$$p = \lambda/(n-1) \text{ and } \Delta z = \lambda\phi/2\pi(n-1)$$

corresponding to a rotation of $-\phi$ per step, the same parameters in the present case are:

$$p = 2\lambda/(n-1) \text{ and } \Delta z = \lambda\phi/\pi(n-1)$$

corresponding to a rotation of $-2\phi$ per step. If $\phi = \pi/4$ the first step is a quarter-wave plate, the second is a half-wave plate and so on.

the helicoid or the steps are cut either on that surface of lens 7 which faces lens 9, or on that surface of lens 9 which faces lens 7. A liquid having an index n' very close to the optical index n of the glass forming the helicoid is inserted between the two lenses. The resulting pitch is given by:

$$p = 2\lambda/(n-n') \tag{28}$$

Thus, the pitch is considerably increases and the cutting accuracy can be lower.

Figures 3, 4, 5:
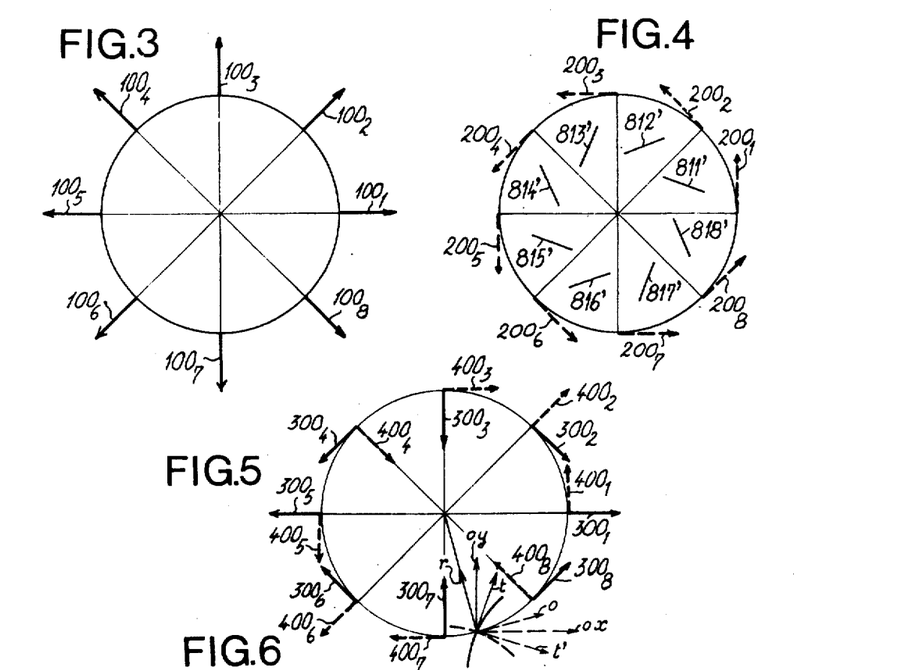
FIGS. 3, 4, 5, 6 show electric field patterns in phase surfaces.

FIG. 3 shows in full line the electric field pattern of a TM$_0$ mode wave which is formed by radial vectors. Eight vectors $100_1$-$100_8$ are represented making therebetween angles of 45°.

FIG. 4 shows in broken line the electric field pattern of a TE$_0$ mode wave which is formed by orthoradial vectors tangent to a circle. Eight vectors $200_1$-$200_8$ are represented making therebetween angles of 45°. They are respectively in phase quadrature with the vectors $100_1$-$100_8$ of FIG. 3.

FIG. 5 shows in full line the electric field pattern of a first order azimuthally phase shifted rectilinear polarized wave and in dotted line the electric field pattern of a wave orthogonal to and in phase quadrature with said first order azimuthally phase shifted rectilinear polarized wave. The first pattern of FIG. 5 comprises the eight full line vectors $300_1$-$300_8$ which are derived from vectors $100_1$-$100_8$ by rotating the latter by two times their azimuth in the negative direction. For example, vector $100_4$ has an azimuth of $+135°$ and vector $300_4$ is obtained by rotating vector $100_4$ through $-270°$. The second pattern of FIG. 5 comprises the eight broken line vectors $400_1$-$400_8$ which are derived from vectors $200_1$-$200_8$ by rotating the latter by two times their azimuth in the negative direction. For example, vector $200_6$ has an azimuth of $225°$ and vector $400_6$ is obtained by rotating vector $200_6$ through $-450°$.

Figure 7:
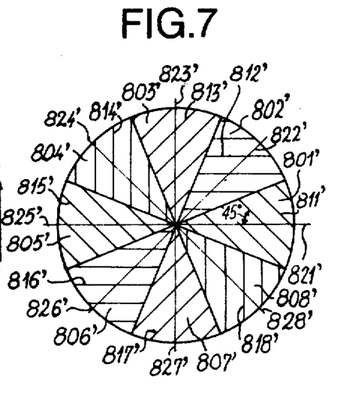
FIG. 7 shows a part of a mode converter for converting a $TM_0$ wave into a circular-polarized wave having a positive phase shift.

As shown in FIG. 2, the mode converter 8 can be constructed according to a second embodiment 8' from a number of quarter-wave plates 81' and a half-wave plate 82'. The incoming TM$_0$ mode wave is converted by the set of quarter-wave plates 81' into a circular-polarized wave having a positive azimuthal phase-shift. This circular polarized wave is formed by a TM$_0$ mode wave (FIG. 3) and a TE$_0$ mode wave (FIG. 4) in phase quadrature therebetween. In FIG. 7, the set of quarter-wave plates comprises 8 sectoral quarter-wave plates $801'$ to $808'$ having rapid axes $811'$ to $818'$ inclined at 45° to the sector bisectors $821'$ to $828'$. For example, the rapid axis $811'$ of the quarter-wave plate $801'$ makes an angle of 45° with the bisector $821'$ of the sector. In this manner, the TM$_0$ wave is converted into a sum of a TE$_0$ and a TM$_0$ waves in phase quadrature, which together form a wave having circular polarization and a positive azimuthal phase-chift. of the first order. The half-wave plate 82' converts the circular-polarized wave having a positive azimuthal phase shift into a circular-polarized wave having a negative azimuthal phase shift, i.e. it changes the direction of rotation of the circular-polarized wave without changing the phase shift in dependence on the azimuth, which is a characteristic of the wave entering the second mode converter and given to the wave by the first mode converter. In addition, reference may be made to FIG. 2 in the aforementioned patent application and to FIG. 5 of the present application showing that, at any point on these figures, the direction of the tangent t to a continuous-line hyperbola is symmetrical, with respect to the axes Ox, Oy, of the radial direction r of the electric vector of a TM$_0$ wave, and the tangent t' to a broken-line hyperbola is symmetrical with respect to the axes Ox, Oy, of the orthoradial direction o, i.e. the direction of the electric vector of the TE$_0$ wave. Consequently, a half-wave plate having Ox and Oy as its rapid and slow axes converts the TM$_0$ and TE$_0$ modes into two orthogonal TE$_2$ modes.

More precisely, the sectoral quarter wave plates $81'$ convert the vestors $100_1$-$100_8$ of the TM$_0$ mode to the vectors $200_1$-$200_8$ of the TE$_0$ mode and the half-wave plate 82' converts the vectors $100_1$-$100_8$ to the vectors $300_1$-$300_8$ symmetrical of vectors $100_1$-$100_8$ with respect to Ox and the vectors $200_1$-$200_8$ to the vectors $400_1$-$400_8$ symmetrical of vectors $200_1$-$200_8$ with respect to Oy.

Figure 6:
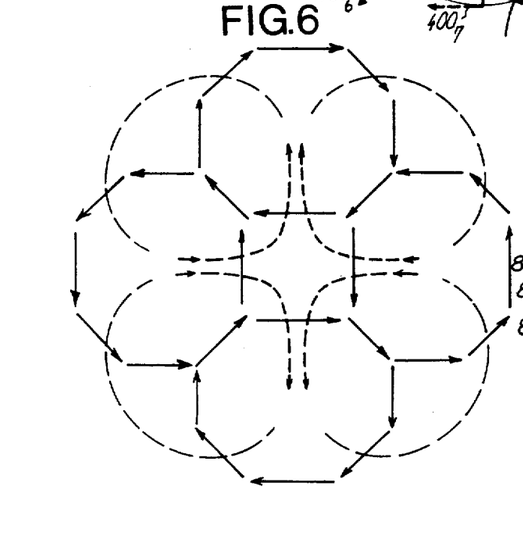

When the electric field pattern is concentrated by lens 9, the diffraction gives in the configuration in FIG. 6, which has the same elements of symmetry as the fields illustrated in FIG. 5, and more clearly illustrates the two families of hyperbolic lines of force, which are orthogonal near the center, like those in FIG. 2 in the aforementioned patent application.

It is convenient to use sectoral quarter-wave plates secured by molecular adhesion to the flat surface of lens 7 or 9, and a half-wave plate secured by molecular adhesion to the flat surface of the other lens, particularly if, owing to the dimensions of the crystal, the plates have to be made in several pieces. A liquid having a suitable index should be used between lenses 7 and 9, to prevent excessive multiple vitreous reflections.

The conical dioptric elements 5, 7, 61 in FIG. 2 provides an excellent mode filter for TM$_0$ waves. Only the TM$_0$ mode travels through the dioptric elements at the Brewster angle; the other moade are eliminated by reflection. Similarly, if the rectilinear cross-section of the cones is replaced by a slightly curved cross-section remaining near the Brewster angle, the most desirable power distribution can be obtained, in dependence on the radius.

Figure 8:
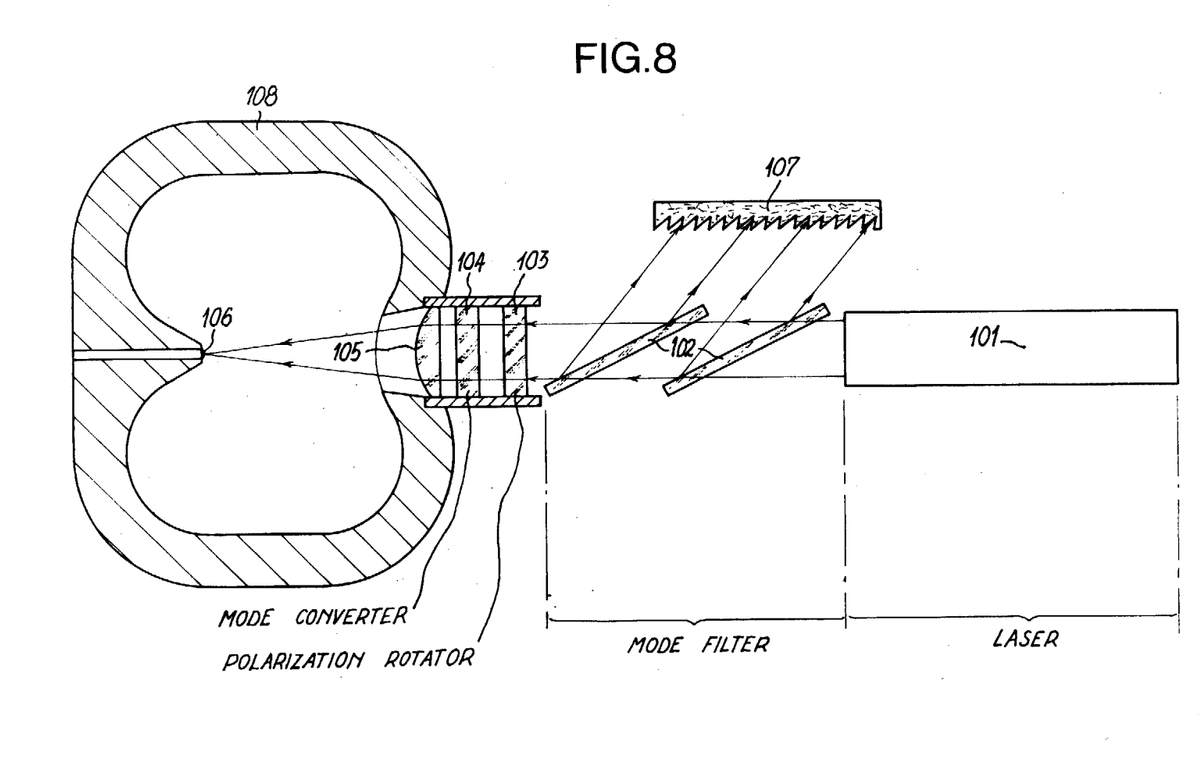
FIG. 8 shows a power laser comprising a device for protection against reflected waves according to the invention, together with a mode converter which converts the initial rectilinear-polarized beam into a confining wave in accordance with a mode having circular polarization and a first-order negative azimuthal phase-shift.

Referring now to FIG. 8, reference numeral 101 denotes a doped glass laser which emits a beam having rectilinear polarization in the plane of the drawing. The beam travels without reflection through parallel sided plates 102 perpendicular to the plane of the figure and struck by the beam at the Brewster angle. A Faraday-effect polarization rotator 103 rotates the beam polarization direction through 45° and the emergent beam strikes a mode converter 104. Converter 104 is of the kind described in the aforementioned patent application illustrated in FIGS. 9 and 10 of this application. The mode converter is made up of sector-shaped elementary half-wave plates whose rapid (or slow) axes are disposed to form a broken parabolic or hyperbolic curve. Converter 104 converts the incident, rectilinearly polarized mode of the beam into a $TE_0$ or $TE_2$ mode. Next, the beam is focused on to a target 106 by a lens 105. Target 106 reflects part of the received wave, and the reflected wave is converted into a plane wave by the lens 105 and becomes a rectilinearly polarized beam on travelling through the half-wave plates forming the mode converter 104. The reason is that the components of the wave which have been delayed by a half-period during the direct travel experience an additional delay of a half-period during the return travel, i.e. a delay of a period during the direct and return travel. Consequently, the reflected beam is rectilinearly polarized on leaving the mode converter 104. The Faraday-effect polarization rotator 103 rotates the polarisation of the received reflected beam by 45° on return, and the reflected beam strikes plates 102 with its polarization perpendicular to the plane of the draxing. Thus, the reflected beam is not transmitted to laser 101 but reflected to an absorber 107 and does not interfere with the operation of laser 101.

The polarization rotator 103 is a quarter-wave plate. This quarter-wave plate is disposed perpendicular to the beam, its rapid and slow axes being inclined at 45° to the polarization plane of the beam; it converts the rectilinearly polarized incident beam into a circular-polarized beam and, during the return, gives another rectilinear-polarized beam in a direction perpendicular to the polarization direction of tue initial beam. The returning beam cannot therefore reach laser 101 and is reflected, as previously described, by plates 102 to absorber 107.

The mode converter 104 is an aximuthal phase-shifter of the kind shown in FIGS. 4 and 5 of the aforementioned patent application, i.e. a phase-shifter comprising a plate of isotropic material transparent to the electromagnetic wave and having a flat surface and a helicoidal surface, the pitch of the helicoid being $\lambda/(n-1)$ where $\lambda$ is the wavelength and n the index of the transperent material. As already said, the helicoidal surface of the phase-shifter can be approximated by a spiral stairway surface, the steps having a sector shape, an apex angle $2\pi/q$ and a height $\lambda/q(n-1)$ where q is the number of steps. Phase-shifters of this kind do not influence the polarization of the reflected wave, and the protecting device operates in the manner previously described.

Figure 9:
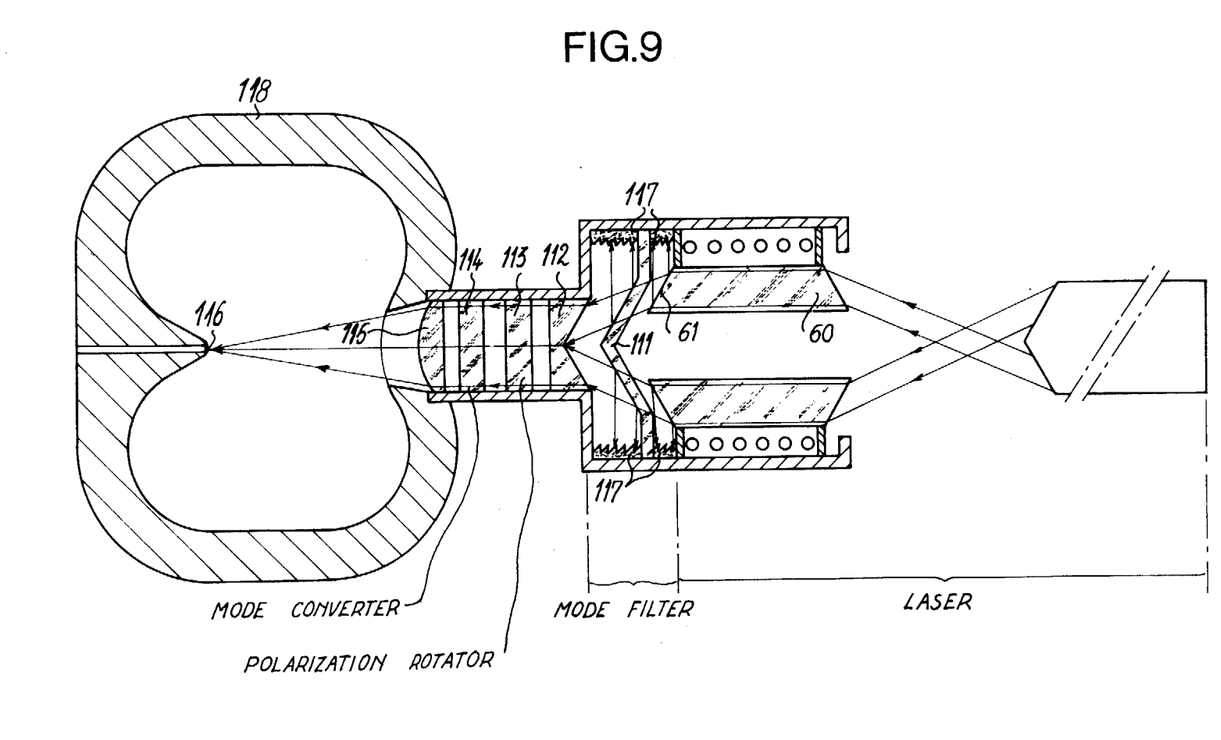
FIG. 9 shows a power laser comprising a device for protection against reflected waves according to the invention, together with a mode converter which converts the laser beam having $TM_0$ mode polarization into a confining wave in a propagation mode having circular polarization and a first-order negative azimuthal phase shift.

Referring now to FIG. 9, the laser used is the power laser of FIG. 2, the last amplifier stage comprising a cylindrical sleeve of doped glass 60. The laser wave coming from the amplifying laser propagates in the $TM_0$ mode. The device in FIG. 9 for protection against reflected waves is placed at the outlet of the amplifying laser and comprises a mode filter for the $TM_0$ mode made up of conical dioptric elements 61, 112, and a Brewster cone 111. The protecting device in FIG. 9 also comprises a Faraday-effect polarization rotator 113. Rotator 113 rotates the polarization of the received beam by 45° at any point on the phase surface, and converts the $TM_0$ mode into a TEM mode for which the $TM_0$ and $TE_0$ modes have equal energy and are cophasal. A half-wave plate 114 converts the modes into two modes $TE_2$ offset by 45° in space relative to one another, the sum of the modes giving a single $TE_2$ mode. The beam coming from the half-wave plate 114 is focused onto a target 116 by a lens 115. The reflected energy is converted into a plane wave, likewise by lens 115. The reflected wave travels through the half-wave plate 114 in the return direction and comes out having the initial mode TEM. Next, the reflected wave having the TEM mode enters the Faraday-effect polarization rotator 113 and is converted into a pure $TE_0$ mode which is reflected by the conical dioptric elements 61, 112 and the Brewster cone 111 to an absorber 117 which surrounds these elements.

We have seen how a conversion from $TM_0$ and $TE_0$ mode to the circular mode $[TEM_{-2}]$ can be brought about by a rotation of the polarization equal to twice the azimuth. Consequently, the half-wave plate 114 can be replaced by an azimuthal phase-shifter of the kind shown in FIGS. 4 and 5 of the aforementioned patent application, wherein the pitch of the helicoid (FIG. 4 of the aforementioned application) or the height of the steps (FIG. 5 of the aforementioned application) are equel to $2\lambda/(n-1)$ and $2\lambda/q(n-1)$ respectively.

According to another embodiment, the polarization rotator in the protection device shown in FIG. 9 can comprise a sector-shaped quarter-wave plate, the fast (or slow) axis of each sector being at 45° with respect to the sector bisectors, as shown in FIG. 4. The sector-shaped elementary plates are joined edge to edge on a support. The polarization rotator comprising the set of sector-shaped quarter-wave plates converts the $TM_0$ wave into a circular-polarized wave having a first-order positive azimuthal phase-shift (a pair of $TM_0$ and $TE_0$ modes). The wave is converted into a circular polarized wave having a negative azimuthal phase shift by a mode converter 114. In that case, mode converter 114 will be either a half-wave plate or an azimuthal phase shifter. Alternatively, component 114 can be eliminated by regrouping the operations of filtering and mode conversion by cutting one of the conical dioptric elements or Brewster cones 61, 111, 112 in spiral form. The circular-polarized wave having a negative azimuthal phase shift are focused by lens 115 on to the fusible material 116. All the reflected power is converted into $TE_0$ mode by passing through the sector-shaped quarter-wave plates, and is reflected to absorber 117.

In all the cases described, the fusible material of target 106 or 116 on to which the energy of the confining wave is focused, is placed in an axial magnetic field generated by a magnet 118, as shown in FIGS. 8 and 9. The magnetic field has a gradient with a maximum on the side of the target material, in order to obtain the maximum possible plasma density.

What I claimed is:

1. A generator and amplifier of plasma confining, electromagnetic, light or infrared wave beam comprising:
   a generator of a $TM_0$ mode wave beam;
   a solid state laser beam amplifier having a doped active material in the shape of an annular sleeve member;
   means for applying said $TM_0$ mode wave beam to said solid state laser for amplification thereof, with said $TM_0$ mode wave beam coaxial with said sleeve member; and a mode converter converting said amplified $TM_0$ mode wave beam to a negatively azimuthally phase shifted, circular polarized wave beam.

2. A generator and amplifier of plasma confining, electromagnetic, light or infrared wave beam comprising:

a generator of a rectilinear polarized wave beam;

a first mode converter converting said rectilinear polarized wave beam to a $TM_0$ mode wave beam;

a solid state laser beam amplifier having a dpoed active material in the shape of an annular sleeve member;

means for applying said $TM_0$ mode wave beam to said solid state laser for amplification thereof, with said $TM_0$ mode wave beam coaxial with said sleeve member; and a second mode converter converting said amplified $TM_0$ mode wave beam to a negatively azimuthally phase shifted, circular polarized wave beam.

3. A generator and amplifier of plasma confining, electromagnetic, light or infrared wave beam as set forth in claim 2 wherein the first mode converter converting the rectilinear polarized wave beam to a $TM_0$ mode wave beam comprises:

a plate of isotropic material transparent to said rectilinear polarized wave beam having a plane surface and a helicordal surface, the pitch of said helicordal surface being equal to $\lambda/(n-1)$ where $\lambda$ is the wavelength of the rectilinear polarized wave beam and n is the index of the transparent material.

4. A generator and amplifier of plasma confining, electromagnetic, light or infrared wave beam as set forth in claim 2 wherein the first mode converter converting the rectilinear polarized wave beam to a $TM_0$ mode wave beam comprises:

a plate of isotropic material transparent to said rectilinear polarized wave beam having a plane surface and a face in the form of a spiral staircase, the steps of which having a sector shape with an apex of $2\pi/q$ and a height of $\lambda/q\,(n-1)$ where $\lambda$ is the wavelength of the rectilinear polarized wave beam, n is the index of the transparent material and q is the number of steps.

5. A generator and amplifier of plasma confining, electromagnetic, light or infrared wave beam as set forth in claim 2 wherein the first mode converter converting the rectilinear polarized wave beam to a $TM_0$ mode wave beam comprises:

a plurality of elementary half-waves plates made of birefringent material transparent to said rectilinear-polarized wave beam, each having a sectoral shape and joined together to form a regular polygon, the rapid axes of the elementary plates being disposed in each plate so as to form a broken parabolic curve on said regular polygon.

6. A generator and amplifier of plasma confining, electromagnetic, light or infrared wave beam comprising:

a generator of a $TM_0$ mode wave beam;

a solid state laser beam amplifier having a doped active material in the shape of an annular sleeve member;

means for applying said $TM_0$ mode wave beam to said solid state laser for amplification thereof, with said $TM_0$ mode wave beam coaxial with said sleeve member;

means for converting the $TM_0$ mode wave beam into a wave beam having a $TM_0$ component mode and a $TE_0$ component mode, said components being in phase quadrature: and a plate of isotropic material transparent to said $TM_0$ and $TE_0$ mode wave beams having a plane surface and a helicordal surface, the pitch of said helicordal surface being equal to $2\lambda/(n-1)$ where $\lambda$ is the wavelength of the $TM_0$ and $TE_0$ component mode wave beams and n is the index of the transparent material.

7. A generator and amplifier of plasma confining, electromagnetic, light or infrared wave beam comprising:

a generator of a $TM_0$ mode wave beam;

a solid state laser beam amplifier having a doped active material in the shape of an annular sleeve member;

means for applying said $TM_0$ mode wave beam to said solid state laser for amplification thereof, with said $TM_0$ mode wave beam coaxial with said sleeve member;

means for converting the $TM_0$ mode wave beam to a wave beam having a $TM_0$ component mode and a $TE_0$ component mode, said components being in phase quadrature; and a plate of isotropic material transparent to said $TM_0$ and $TE_0$ component mode wave beams having a plane surface and a face in the form of a spiral staircase, the steps of which having a sector shape with an apex of $2\pi/q$ and a height of $2\lambda/q\,(n-1)$ where $\lambda$ is the wavelength of the $TM_0$ and $TE_0$ component mode wave beams, n is the index of the transparent material and q is the number of steps.

8. A generator and amplifier of plasma confining, electromagnetic, light or infrared wave beam comprising:

a generator of a $TM_0$ mode wave beam;

a solid state laser beam amplifier having a doped active material in the shape of an annular sleeve member;

means for applying said $TM_0$ mode wave beam to said solid state laser for amplification thereof, with said $TM_0$ mode wave beam coaxial with said sleeve member;

means for converting the $TM_0$ mode wave beam to a wave beam having a $TM_0$ component mode and a $TE_0$ component mode, said components being in phase quadrature; and a plurality of elementary half-wave plates made of birefringent material transparent to said $TM_0$ and $TE_0$ component mode wave beams, each having a sectoral shape and joined together to form a regular polygon, the rapid axes of the elementary plates being disposed in each plate so as to form a broken hyperbolic curve on said regular polygon.

9. A generator and amplifier of plasma confining, electromagnetic, light or infrared wave beam comprising:

a generator of a $TM_0$ mode wave beam;

a solid state laser beam amplifier having a doped active material in the shape of an annular sleeve member;

means for applying said $TM_0$ mode wave beam to said solid state laser for amplification thereof, with said $TM_0$ mode wave beam coaxial with said sleeve member;

means for converting the $TM_0$ mode wave beam to a wave beam having a $TM_0$ component mode and a TE$_0$ component mode, said components being in phase quadrature;

six elementary half-wave plates of birefringent material transparent to said TM$_0$ and TE$_0$ component mode wave beams, each having the shape of an equilateral triangle and joined together to form a regular hexagon, the rapid axes of the elementary plates forming angles of 0°, 150°, 120°, 90°, 60°, 30° with a reference direction in the six successively adjacent elementary half-wave plates.

10. A generator and amplifier of plasma confining, electromagnetic, light or infrared wave beam comprising:

a generator of a TM$_0$ mode wave beam;

a solid state laser beam amplifier having a doped active material in the shape of an annular sleeve member;

means for applying said TM$_0$ mode wave beam to said solid state laser for amplification thereof, with said TM$_0$ mode wave beam coaxial with said sleeve member;

a half-wave plate made of birefringent material transparent to said TM$_0$ and TE$_0$ component mode wave beams, perpendicular to said TM$_0$ mode wave beam; and a plurality of elementary quarter-wave plates made of birefringent material transparent to said TM$_0$ and TE$_0$ component mode wave beams and adjacent to said half-wave plate, each having the shape of a sector and joined together to form a regular polygon, the rapid axes of the elementary plates being disposed in each plate so as to form a 45° angle with the bisector of the sector.

* * * * *